United States Patent [19]

Pasternak et al.

[11] Patent Number: 5,171,449
[45] Date of Patent: Dec. 15, 1992

[54] MEMBRANE AND METHOD OF SEPARATION

[75] Inventors: Mordechai Pasternak, Spring Valley; Uygur Köktürk, Poughkeepsie, both of N.Y.

[73] Assignee: Texaco Inc., White Plains, N.Y.

[21] Appl. No.: 817,220

[22] Filed: Jan. 6, 1992

[51] Int. Cl.$^5$ .............................................. B01D 61/36
[52] U.S. Cl. ........................................ 210/640; 55/16
[58] Field of Search ........ 210/634, 640, 644, 649–654, 210/500.1, 500.27; 55/16, 158

[56] References Cited

PUBLICATIONS

"Desalination by the Use of Dynamically Formed PVA Membranes", *Desalination*, 46(1983), 335–342, Wang Ying et al.

*Primary Examiner*—Frank Sever
*Attorney, Agent, or Firm*—Robert A. Kulason; James J. O'Loughlin; Carl G. Seutter

[57] ABSTRACT

Charge compositions containing aqueous mixtures of organic nitrogen compounds may be separated by pervaporation through a membrane assembly containing a porous ceramic support bearing as separating layer, polyvinyl alcohol which has been cross-linked as with glutaraldehyde.

11 Claims, No Drawings

MEMBRANE AND METHOD OF SEPARATION

FIELD OF THE INVENTION

This invention relates to the dewatering of organic nitrogen-containing components such as amines. More particularly it relates to a membrane technique for separating water from an aqueous composition containing an amine such as ethylene diamine.

BACKGROUND OF THE INVENTION

As well known to those skilled in the art, it is possible to remove water from mixtures thereof with organic liquids by various techniques including adsorption or distillation. These conventional processes, particularly distillation, are however, characterized by high capital cost. In the case of distillation for example the process requires expensive distillation towers, heaters, heat exchangers (reboilers, condensers, etc.), together with a substantial amount of auxiliary equipment typified by pumps, collection vessels, vacuum generating equipment, etc.

Such operations are characterized by high operating costs principally costs of heating and cooling—plus pumping, etc.

Furthermore the properties of the materials being separated, as is evidenced by the distillation curves, may be such that a large number of plates may be required, etc. When the material forms an azeotrope with water, additional problems may be present which for example, may require that separation be effected in a series of steps (e.g. as in two towers) or by addition of extraneous materials to the system.

There are also comparable problems which are unique to adsorption systems.

It has been found to be possible to utilize membrane systems to separate mixtures of miscible liquids by pervaporation. In this process, the charge liquid is brought into contact with a membrane; and one component of the charge liquid preferentially permeates the membrane. The permeate is then removed as a vapor from the downstream side of the membrane—typically by reducing the pressure below the vapor pressure of the permeating species or by sweeping with a carrier gas.

The cost effectiveness of a membrane is determined by the selectivity and productivity. Of the membranes commercially available, an illustrative membrane of high performance is that disclosed in European patent 0 096 339 A2 of GFT as assignee of Bruschke—published Dec. 21, 1983.

European Patent 0 096 339 A2 to GFT as assignee of Bruschke discloses, as cross-linking agents, diacids (typified by maleic acid or fumaric acid); dihalogen compounds (typified by dichloroacetone or 1,3-dichloroisopropanol); aldehydes, including dialdehydes, typified by formaldehyde. These membranes are said to be particularly effective for dewatering of aqueous solutions of ethanol or isopropanol.

This reference discloses separation of water from alcohols, ethers, ketones, aldehydes, or acids by use of composite membranes. Specifically the composite includes (i) a backing typically about 120 microns in thickness, on which is positioned (ii) a microporous support layer of a polysulfone or a polyacrylonitrile of about 50 microns thickness, on which is positioned (iii) a separating layer of cross-linked polyvinyl alcohol about 2 microns in thickness.

Polyvinyl alcohol may be cross-linked by use of difunctional agents which react with the hydroxyl group of the polyvinyl alcohol. Typical cross-linking agent may include dialdehydes (which yield acetal linkages), diacids or diacid halides (which yield ester linkages), dihalogen compounds or epichlorhydrin (which yield ether linkages) olefinic aldehydes (which yield ether/acetal linkages), boric acid (which yields boric ester linkages), sulfonamidoaldehydes, etc.

See also J. G. Prichard, *Polyvinyl Alcohol, Basic Properties and Uses,* Gordon and Breach Science Publishers, New York (1970) or C. A. Finch, *Polyvinyl Alcohol, Properties and Applications,* John Wiley and Sons, New York (1973).

Also of interest is U.S. Pat. No. 4,755,299 to GFT Ingenieurebüro für Industrieanlagenbau as assignee of H. Bruschke directed to a separation process using e.g. polysulfone bearing polyvinyl alcohol separating layer which has been cross-linked (e.g. col 2, line 66 to column 3, line 7 inter alia) by esterification with dicarboxylic acids, etherification with acids or dihalogen compounds, or acetalization by means of aldehydes or dialdehydes (note e.g. formaldehyde Ex 3); and European Specification 0 096 339 published 21.12.83 Bulletin 83/51 to the same assignee by the same inventor.

U.S. Pat. No. 4,802,988 which issued Feb. 7, 1989 to Texaco as assignee of John Reale, Jr. and Craig R. Bartels is directed to separation of aqueous organic oxygenates by pervaporation through a membrane of polyvinyl alcohol which has been cross-linked with aliphatic polyaldehydes having $\geq 3$ carbon atoms.

U.S. Pat. No. 4,941,976 which issued Jul. 17, 1991 to Texaco as assignee of Craig R. Bartels and John Reale, Jr. (a divisional of U.S. Pat. No. 4,802,988) is directed to the membrane.

U.S. Pat. No. 5,004,861 which issued Apr. 2, 1991 to Texaco as assignee of Mordechai Pasternak, Craig R. Bartels, and John Reale, Jr. is directed to separation of water from a charge mixture of hydrocarbon/organic oxygenate by pervaporation through a membrane of (i) polyvinyl alcohol which has been cross-linked with aliphatic polyaldehydes having $\geq 3$ carbon atoms.

U.S. Pat. No. 4,961,855 which issued Oct. 9, 1990 to Texaco as assignee of Craig R. Bartels and John Reale, is directed to separation of water/organic oxygenates (such as isopropanol) by pervaporation through a membrane of polyvinyl alcohol which has been cross-linked with aliphatic polyaldehydes having $\geq 3$ carbon atoms.

U.S. Pat. No. 4,935,144 which issued Jun. 19, 1990 to Texaco as assignee of Mordechai Pasternak, Craig R. Bartels, and John Reale, Jr. is directed to separation of ketones from aqueous systems by pervaporation through a membrane of polyvinyl alcohol which has been cross-linked with aliphatic polyaldehydes having $\geq 3$ carbon atoms.

U.S. Pat. No. 4,910,344 which issued May 20, 1990 to Texaco as assignee of Mordechai Pasternak, Craig R. Bartels, and John Reale, Jr. is directed to separation of organic oxygenates from aqueous systems by pervaporation through a membrane of polyvinyl alcohol/polyacrylic acid.

U.S. Pat. No. 4,960,519 which issued Oct. 20, 1990 to Texaco as assignee of Mordechai Pasternak, Craig R. Bartels, John Reale, Jr. and Vatsal M. Shah is directed to separation of alcohol from organic oxygenate by pervaporation through a membrane of polyvinyl alcohol/polyacrylic acid.

U.S. Pat. No. 4,971,699 which issued Nov. 20, 1990 to Texaco as assignee of Craig R. Bartels is directed to separation of water/organic oxygenate by pervaporation through a membrane of polyvinyl alcohol/polyacrylic acid.

U.S. Pat. No. 5,004,861 which issued Apr. 2, 1991 to Texaco as assignee of Mordechai Pasternak, Craig R. Bartels, and John Reale, Jr. is directed to separation of water from a charge containing a hydrocarbon and an organic oxygenate by pervaporation through a membrane of (i) polyvinyl alcohol cross-linked with aliphatic polyaldehydes having $\geq 3$ carbon atoms or (ii) a blend of a polyvinyl alcohol and a polyacrylic acid.

Although the above systems have been found to be successful in separating aqueous compositions of organic oxygenates at satisfactory Flux and Selectivity, it has been found that attempts to separate aqueous compositions containing liquid nitrogen-containing compounds including amines, such as ethylene diamine, have not been satisfactory. When treating such charge compositions by many of the prior art systems, it is found that the amine destroys the membrane. If a typical prior art membrane of e.g. polyethylenimine or poly(vinyl pyridine) or polyethylenimine cross-linked with toluene diisocyanate is utilized, it is found that the Selectivity is so low that the system is of little or no value. It is also to be noted that many of the prior art membrane systems, which utilize polyacrylonitrile as a porous support layer (on which the separating layer is formed), are destroyed by contact with the charge. For example contact of a membrane containing a polyvinyl alcohol separating layer on a polyacrylonitrile support layer with an 80 wt % aqueous solution of ethylene diamine for only 30 minutes results in a deterioration of the membrane assembly. Specifically, the polyacrylonitrile support layer of the membrane assembly deteriorates; and the assembly ceases to function as a membrane.

It is an object of this invention to provide a novel composite membrane characterized by its ability to effect separation of water from liquid organic nitrogen-containing compounds such as ethylene diamine. Other objects will be apparent to those skilled in the art.

STATEMENT OF THE INVENTION

In accordance with certain of its aspects, this invention is directed to a process for separating a charge aqueous composition containing a liquid organic nitrogen compound which comprises maintaining a porous alumina ceramic support and, mounted thereon, a non-porous separating layer of thickness of 1-10 microns of cast polyvinyl alcohol of molecular weight $\overline{M}_n$ of 20,000-200,000 which has been cross-linked, (preferably in the presence of acid catalyst) with a preferably aliphatic polyaldehyde preferably containing at least three carbon atoms in addition to those in said aldehyde groups;

maintaining a pressure drop across said non-porous separating layer, the high pressure side being adjacent to the outer face of said non-porous separating layer and the low pressure side being adjacent to the outer face of said porous ceramic support;

passing an aqueous charge composition containing water and a liquid organic nitrogen compound into contact with the high pressure side of said non-porous separating layer whereby at least a portion of said water in said aqueous charge and a lesser portion of said liquid organic nitrogen compound pass by pervaporation through said non-porous separating layer and said porous ceramic support as a lean mixture containing more water and less liquid organic nitrogen compound than are present in said aqueous charge and said charge is converted to a rich liquid containing less water and more liquid organic nitrogen compound than are present in said aqueous charge;

recovering from the low pressure side of said porous ceramic support said lean mixture containing more water and less liquid organic nitrogen compound than are present in said aqueous charge, said lean mixture being recovered in vapor phase at a pressure below the vapor pressure thereof; and recovering from the high pressure side of said non-porous separating layer said rich liquid containing a lower water content and a higher liquid organic nitrogen compound content than are present in said aqueous charge.

DESCRIPTION OF THE INVENTION

The composite membrane assembly of this invention typically includes a multi-layer assembly which in the preferred embodiment preferably includes a porous ceramic support layer which provides inter alia mechanical strength and support to the assembly.

THE POROUS SUPPORT

The porous support layer of this invention includes a porous ceramic support which may be fabricated of alumina, silica-alumina, alumina-zirconia, alumina-titania, titania, magnesia, etc. The preferred ceramic permeable support may be alumina, preferably alpha alumina, in the form of a disk or plate, a cylinder or tube, etc., preferably having on its face a layer characterized by a pore size of less than about 500 A, typically 100 A-250 A, say about 100 A.

The porous ceramic support may be one which is commercially available typified by the Membralox brand alpha alumina tube of Alcoa of 10 mm outside diameter, 1.5 mm wall thickness, and 250 mm length. This tube is a built-up assembly of three layers of alpha alumina. The inner layer is characterized by a pore size of about 30,000 A, the intermediate layer by a pore size of about 2,000 A-3,000 A, and the top layer by a pore size of about 100 A.

In practice of the preferred embodiment of this invention, it is possible to deposit the polyvinyl alcohol separating layer directly on the porous ceramic support. It should be noted that the polyvinyl alcohol separating layer may be deposited on the inside or the outside of the preferred tubular porous ceramic support.

The polyvinyl alcohol separating layer is deposited on the face of the ceramic support which is characterized by small (e.g. 100 A) pore size.

THE SEPARATING LAYER

The organic separating layer which permits attainment of separation in accordance with this invention includes a non-porous film of cross-linked polyvinyl alcohol of thickness of about 1-10 microns, preferably 1-5 microns, say 1.5 microns. The layer is formed from polyvinyl alcohol which has been prepared by hydrolysis of polyvinyl acetate-typically 50-100% hydrolyzed, preferably 90-100%, say 100% hydrolyzed. The charge polyvinyl alcohol has a molecular weight of 20,000-200,000, say 88,000. Typically it may be employed as a 5-10 wt %, say 7 wt % aqueous solution. A commercially available product which may be employed is the Aldrich brand of 100% hydrolyzed polyvinyl alcohol of molecular weight of about 88,000 as 7 wt % aqueous solution.

It is a feature of this invention that the cross-linked polyvinyl alcohol separating layer is formed in situ on the porous support layer. This is effected by use, as a cross-linking agent, of a preferably an aliphatic polyaldehyde, preferably a dialdehyde, more preferably containing at least three carbon atoms. More preferably the aliphatic dialdehyde may contain 3-8, commonly 3-6 carbon atoms, most preferably 3 carbon atoms in addition to those in the aldehyde groups. Typical aliphatic dialdehydes which may be employed may include:

TABLE

| |
|---|
| Glutaraldehyde |
| 2-hydroxyhexanedial-1,6 |
| malonic dialdehyde |
| succinic dialdehyde |
| hexanedial-1,6 |

The preferred aliphatic dialdehyde is glutaraldehyde.

In situ cross-linking may be carried out by casting 5-10 wt %, say 7 wt % aqueous solution of polyvinyl alcohol which contains the aliphatic dialdehyde cross-linking agent. The mole ratio of cross-linking agent to polyvinyl alcohol may be 0.05-0.30, say 0.2.

Cross-linking is carried out, in the presence of acid catalyst, preferably inorganic acid. Sulfuric acid is preferred. The mole ratio of acid to aldehyde may be 0.1-0.3, say 0.2.

The composite membrane may then be cured in an oven at 100° C.-150° C., say 125° C. for 10-60 minutes, say 30 minutes to yield a polyvinyl alcohol separating layer having a thickness of 1-10 microns, say 1.5 microns.

It will be found that, when viewed in cross-section, the typical composite membrane assembly includes a support layer of porous ceramic support bearing thereon a 1.5 micron layer of polyvinyl alcohol ($\overline{M}_n$ of 88,000) which has been cross-linked with glutaraldehyde in the presence of sulfuric acid and then cured at 125 ° C. It appears that the separating layer of polyvinyl alcohol penetrates into the pores of the porous ceramic support; and this undoubtedly contributes to the bonding between the separating layer and the support.

In one preferred embodiment, the structure may include a conduit or tube of porous ceramic, preferably alpha alumina. Preparation of the assembly of this invention may include coating the side of the tube characterized by the small pore size, typically 100 A pore size. This may be effected by coating the outside (or more preferably the inside) of this tube with the e.g. 5-10 wt % aqueous solution containing the polyvinyl alcohol ($\overline{M}_n$ of 20,000-200,000) preferably containing e.g. glutaraldehyde in mole ratio of cross-linking agent to polyvinyl alcohol of 0.05-0.3, say 0.2 and sulfuric acid in mole ratio of acid to aldehyde of 0.1-0.3, say 0.2 at ambient temperature of 20° C.-30° C., say 25° C.

Preferably a solution of polyvinyl alcohol and e.g. glutaraldehyde is pumped through the tube for 10-20, say 15 minutes; and thereafter the tube is filled with acid for 10-20, say 15 minutes. Liquid is drained and curing is effected at 100° C.-150 ° C., say 125° C., for 10-60 minutes, say 30 minutes.

The tube so prepared, together with a plurality of other tubes so prepared, is fitted within a shell (in manner comparable to a shell-and-tube heat exchanger) provided with an inlet at one end and an outlet at the other. A baffle-like seal between the inner surface of the shell and the outer surface prevents fluid from bypassing the operative membrane system and insures that fluid enters the system principally at one end. The charge passes from the feed channel, into contact with the separating layer and thence therethrough, and is withdrawn as permeate.

In operation, the charge liquid is admitted to the tube side and passes through the inside of the tubes and exits as retentate. During passage through the tubes, permeate passes through the non-porous separating layer and permeate is collected in the shell side.

Alternatively a honeycomb configuration may be employed.

PERVAPORATION

It is a feature of the non-porous polyvinyl alcohol separating layer that it is found to be particularly effective when used in a pervaporation process. In pervaporation, a charge liquid containing a more permeable and a less permeable component is maintained in contact with a non-porous separating layer; and a pressure drop is maintained across that layer. The charge liquid dissolves into the membrane and diffuses therethrough. The permeate which passes through the membrane and exits as a vapor may be recovered by condensing at low temperature or alternatively may be swept away by use of a moving stream of gas. Preferably, the permeate side of the membrane is maintained at a low pressure, typically 5 mm.Hg.

For general background on pervaporation, note U.S. Pat. Nos. 4,277,344; 4,039,440; 3,926,798; 3,950,247; 4,035,291; etc.

It is a feature of the process of this invention that the membrane may be useful in pervaporation processes for dewatering aqueous solutions of liquid organic nitrogen compounds typified by amines, nitriles, etc.

Typical amines may include:

TABLE

| | |
|---|---|
| ethylene | diamine |
| n-propyl | amine |
| n-butyl | amine |
| diethylene | triamine |
| triethylene | tetramine |
| aniline | |

Typical heterocyclic amines may include:

TABLE

| |
|---|
| pyridine |
| morpholine |
| pyrimidine |

Typical nitriles may include:

TABLE

| |
|---|
| acetonitrile |
| acrylonitrile |
| propionitrile |
| benzonitrile |

A typical charge may contain 50-99 wt %, say 80 wt % aqueous solution of ethylene diamine (EDA).

In practice of the pervaporation process of this invention, the charge aqueous solution at 40° C.-120° C., say 70° C. may be passed into contact with the non-porous separating layer of the membrane of this invention. A pressure drop of about one atmosphere is commonly maintained across the membrane. Typically, the feed or charge side of the membrane is at about atmospheric pressure and the permeate or discharge side of the membrane is at a pressure of about 2-50 preferably 2-20, say 5 mm.Hg.

The permeate which passes through the membrane and the supporting structure includes water and a small proportion of the e.g. ethylene diamine from the charge liquid. Typically, the permeate contains 50-70 wt %, say 60 wt % water. Permeate is recovered in vapor phase.

Pervaporation may typically be carried out at a flux of 0.1-5, say about 2 kilograms per square meter per hour (kmh). Typically, the units may have a Selectivity (measured in terms of wt % water in the permeate during pervaporation at 70° C. of an 80 wt % aqueous solution of ethylene diamine) of ca. 50-60 wt % water.

Practice of the process of this invention will be apparent to those skilled in the art from inspection of the following examples wherein, as elsewhere in this specification, all parts are parts by weight unless otherwise stated.

DESCRIPTION OF SPECIFIC EMBODIMENTS

Example I

In this example which represents the best mode presently known of carrying out the process of this invention, the porous ceramic support is a tube (10 mm outside diameter, 1.5 mm wall thickness, and 250 mm length) of the Alcoa Membralox brand alpha alumina tube (described supra.) of pore size (at the inner surface) of about 100 A.

The separating layer is formed from a coating solution containing 20 g of 7 wt % polyvinyl alcohol ($\overline{M}_n$ of 88,000) in water to which is added an aqueous 25 wt % solution of glutaraldehyde in mole ratio of glutaraldehyde to polyvinyl alcohol of about 0.2. This solution is continuously pumped through the tube for 15 minutes. There is then added to the tube 0.05N aqueous sulfuric acid in mole ratio of acid to glutaraldehyde of 0.2. After 15 minutes the acid is withdrawn, and the membrane is cured at 125° C. for 30 minutes.

To the inside of the tube of this membrane assembly, there is charged aqueous solution containing 76.7 wt. % ethylene diamine. Pervaporation at charge pressure of atmospheric pressure and permeate pressure at 5 mm Hg is carried out over 22 days at 70° C. The permeate contains (Selectivity) 60.8 wt % water and the Flux is 2.1 kmh.

Example II

In this example, the procedure of Example I is followed except that the membrane tested is a film of unsupported polyvinyl alcohol. The charge contains 83 wt % ethylene diamine and 17 wt % water. The Selectivity is 53.9 wt % and the Flux is 1.7 kmh.

This film, however, lacks mechanical stability and is it difficult to handle because of the absence of any support.

Example III*

In this control example, the procedure of Example I is followed except that the separating layer is a layer of polyethylenimine of $\overline{M}_n$ of 60,000. Charge contains 79.9 wt % ethylene diamine/20.1 wt % water. Initially the Selectivity is 32.6 wt % and the Flux is 9.8 kmh.

It is observed, however, that after 24 hours, the Selectivity and Flux drop substantially.

Example IV*

In this control example, the procedure of Example III* is followed except that there is no support—only a layer of polyethylenimine as in Example III*, and it is not on a ceramic support. Charge contains 82.6 wt % ethylene diamine and 17.4 wt % water. The Selectivity is 31.5 wt % and the Flux is 4.8 kmh. Selectivity and Flux drop substantially after 24 hours.

Example V*

In this control example, the procedure of Example I is followed except that the separating layer is a membrane of polyethylenimine ($\overline{M}_n$ of 60,000) which has been cross-linked with toluene diisocyanate. Essentially no separation is attained.

Examples VI-VII

In these examples, the procedure of Example I is repeated except for the concentration of charge.

| Example | Charge % EDA | Selectivity % water in Permeate | Flux kmh |
|---|---|---|---|
| VI | 74.6 | 57.2 | 3.1 |
| VII | 78.1 | 59.5 | 1.6 |

Examples VIII*-XII*

In these control examples, each of the following putative support materials, as a membrane, is immersed in an aqueous solution of 80% ethylene diamine.

TABLE

| Example | Support Layer |
|---|---|
| VIII* | Polysulfone |
| IX* | Polyvinylidenedifluoride |
| X* | Polybenzimidazol |
| XI* | Polyamide |
| XII* | Polyacrylonitrile |

In each of Example VIII*-XII*, the membrane is attacked by the amine and fails to maintain the necessary structural integrity after about several hours contact with the ethylene diamine.

Results comparable to those of Example I may be attained if the charge is an aqueous composition containing:

TABLE

| Example | Nitrogen Compound |
|---|---|
| XIII | n-propyl amine |
| XIV | n-butyl amine |
| XV | aniline |
| XVI | diethylene triamine |
| XVII | triethylene tetramine |
| XVIII | pyridine |
| XIX | morpholine |
| XX | acrylonitrile |
| XXI | propionitrile |
| XXII | benzonitrile |

Although this invention has been illustrated by reference to specific embodiments, it will be apparent to those skilled in the art that various charges and modifications may be made which clearly fall within the scope of the invention.

We claim:

1. The process for separating a charge aqueous composition containing a liquid organic nitrogen compound which comprises maintaining a porous ceramic support and, mounted thereon, a non-porous separating layer of thickness of 1-10 microns of cast polyvinyl alcohol of molecular weight $\overline{M}_n$ of 20,000-200,000 which has been cross-linked with an aliphatic polyaldehyde containing at least three carbon atoms in addition to those in said aldehyde groups, and thereafter cured;

maintaining a pressure drop across said non-porous separating layer, the high pressure side being adjacent to the outer face of said non-porous separating layer and the low pressure side being adjacent to the outer face of said porous ceramic support;

passing an aqueous charge composition containing water and a liquid organic nitrogen compound into contact with the high pressure side of said non-porous separating layer whereby at least a portion of said water in said aqueous charge and a lesser portion of said liquid organic nitrogen compound pass by pervaporation through said non-porous separating layer and said porous ceramic support as a lean mixture containing more water and less liquid organic nitrogen compound than are present in said aqueous charge and said charge is converted to a rich liquid containing less water and more liquid organic nitrogen compound than are present in said aqueous charge;

recovering from the low pressure side of said porous ceramic support said lean mixture containing more water and less liquid organic nitrogen compound than are present in said aqueous charge, said lean mixture being recovered in vapor phase at a pressure below the vapor pressure thereof; and recovering from the high pressure side of said non-porous separating layer said rich liquid containing a lower water content and a higher liquid organic nitrogen compound content than are present in said aqueous charge.

2. The process claimed in claim 1 wherein said organic nitrogen compound is an amine.

3. The process claimed in claim 1 wherein said organic nitrogen compound is ethylene diamine.

4. The process claimed in claim 1 wherein said organic nitrogen compound is n-propyl amine.

5. The process claimed in claim 1 wherein said organic nitrogen compound is diethylene triamine.

6. The process claimed in claim 1 wherein said organic nitrogen compound is triethylene tetramine.

7. The process claimed in claim 1 wherein said organic nitrogen compound is aniline.

8. The process claimed in claim 1 wherein said ceramic support is alumina.

9. The process claimed in claim 1 wherein said cross-linking is effected with a glutaraldehyde.

10. The process for separating a charge aqueous composition containing ethylene diamine which comprises maintaining a porous alumina ceramic support and, mounted thereon, a non-porous membrane separating layer of thickness of 1-10 microns of cast polyvinyl alcohol of molecular weight $\overline{M}_n$ of 20,000-200,000 which has been cross-linked in the presence of acid with a dialdehyde containing at least three carbon atoms in addition to those in the aldehyde groups, and thereafter cured;

maintaining a pressure drop across said non-porous membrane separating layer, the high pressure side being adjacent to the outer face of said non-porous separating layer and the low pressure side being adjacent to the outer face of said porous alumina ceramic support;

passing an aqueous charge composition containing water and ethylene diamine into contact with the high pressure side of said non-porous separating layer whereby at least a portion of said water in said aqueous charge and a lesser portion of ethylene diamine pass by pervaporation through said non-porous separating layer and said porous ceramic support as a lean mixture containing more water and less ethylene diamine than are present in said aqueous charge and said charge is converted to a rich liquid containing less water and more ethylene diamine than are present in said aqueous charge;

recovering from the low pressure side of said porous ceramic support said lean mixture containing more water and less ethylene diamine than are present in said aqueous charge, said lean mixture being recovered in vapor phase at a pressure below the vapor pressure thereof; and recovering from the high pressure side of said non-porous separating layer said rich liquid containing a lower water content and a higher nitrogen compound content than is present in said charge.

11. The process of claim 10 wherein said dialdehyde is glutaraldehyde.

* * * * *